Patented Oct. 5, 1943

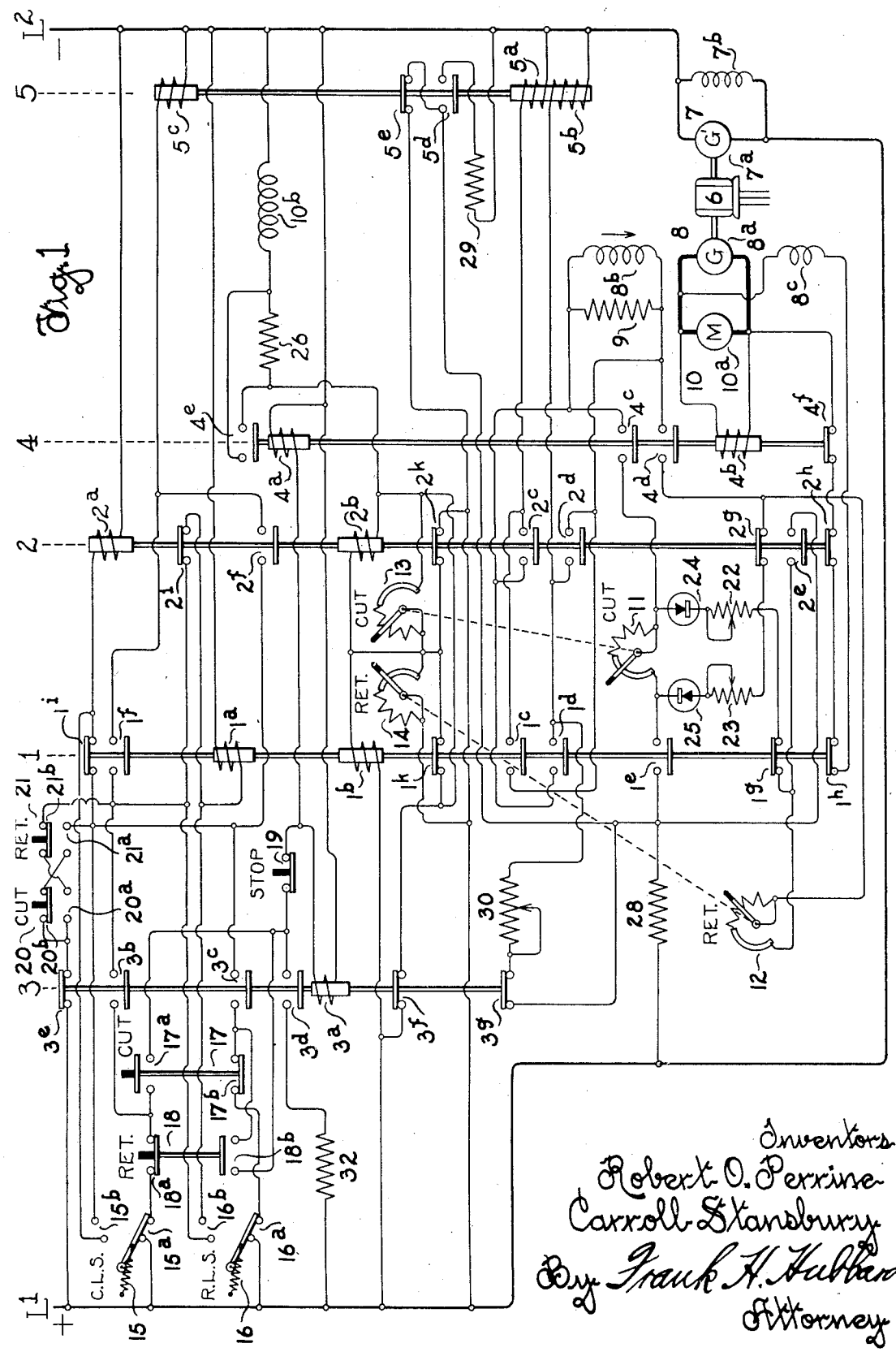

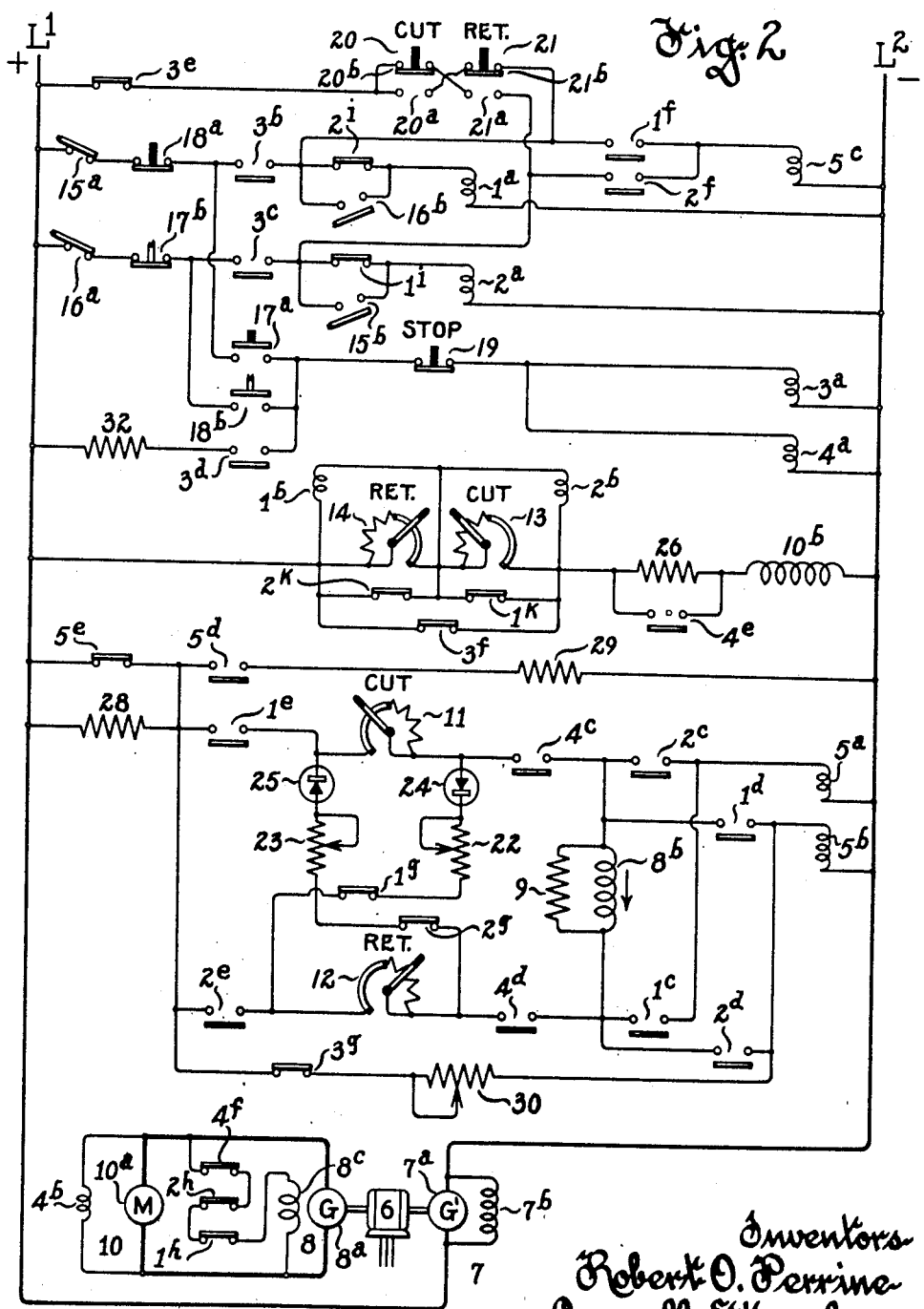

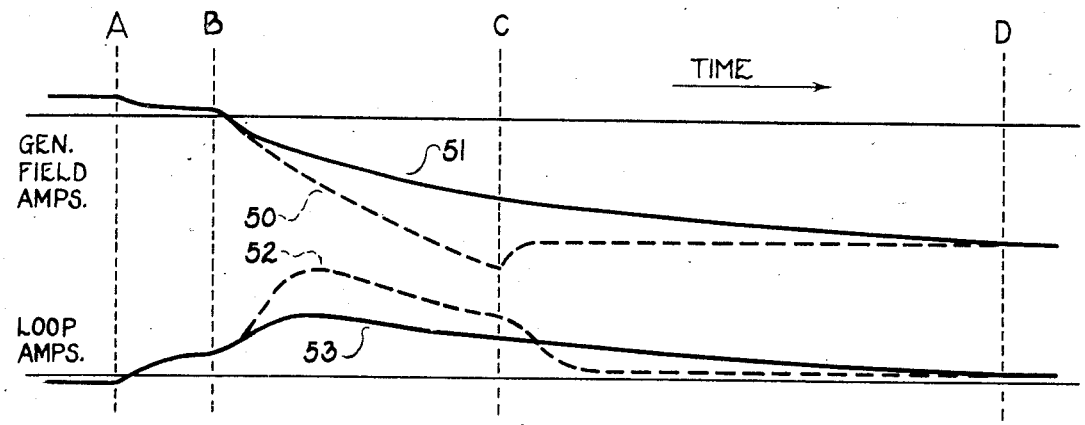
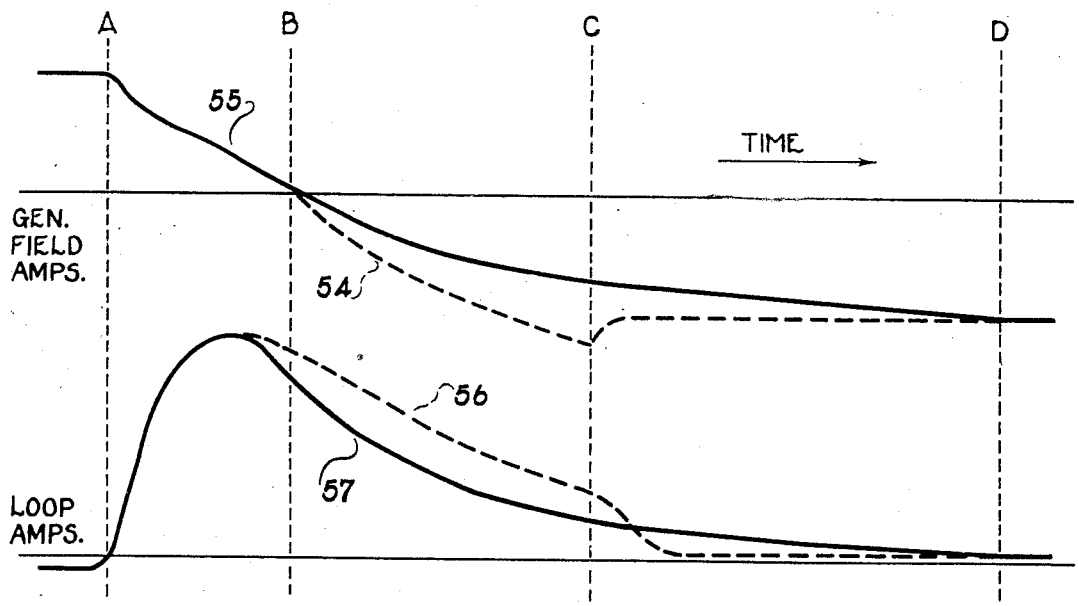

2,330,993

UNITED STATES PATENT OFFICE 2,330,993

MOTOR-GENERATOR CONTROL SYSTEM

Robert O. Perrine and Carroll Stansbury, Wauwatosa, Wis., assignors to Cutler-Hammer, Inc., Milwaukee, Wis., a corporation of Delaware Application January 21, 1942, Serial No. 427,532

23 Claims. (Cl. 172—239)

The invention relates to an electric driving system of the so-called Ward-Leonard type for a planer or other reciprocating machine requiring frequent and rapid reversal.

Such drives include a direct current driving motor which is supplied with energy from a main direct current generator. The output of the latter is controlled by varying its field excitation. The generator is driven by a constant speed motor which also drives an exciter generator to supply current for the main generator and the drive motor field excitation circuits and for the control circuits.

The direction of rotation and speed of the main driving motor are determined by the polarity and voltage of the main generator armature current, which is in turn controlled by the direction and magnitude of its field current.

In most cases, the motor speed range is extended beyond that obtainable with maximum generator armature voltage by weakening of the motor field excitation.

Thus considering the steady state running condition, it is merely necessary to control the magnitude and direction of the current in the generator field winding and the magnitude of the current in the motor field winding. But since the operation involves frequent periodic reversals, the nature of the series of transient current conditions accompanying such reversals greatly affects the overall time efficiency or speed of the system, as well as the satisfactory current commutation in the generator and motor armature circuits. The problem of controlling the transient conditions during reversal is greatly complicated by the wide range of motor speeds between which reversals must take place.

In reversing the generator field excitation, the winding is necessarily disconnected from its source of current supply, and a fraction of a second later it is reconnected to the supply in reverse sense. To avoid too rapid a change of field flux during the intervening period of disconnection it is essential that a suitable discharge path be provided across the field winding. Among the requirements governing the nature of this discharge path are:

1. Its resistance should be varied in accordance with the initial value of the field current at the beginning of the discharge period.

2. Its minimum resistance should be adjustable to afford satisfactory commutation upon reversal from maximum speed.

3. Adjustment of its minimum resistance should not affect the control by the generator field rheostats of the steady-state running speeds of the drive.

In addition to providing the discharge path just described, it may be necessary to delay slightly the reconnection of the field in the opposite sense, especially when reversing the drive from relatively high motor speeds. Since the required amount of this additional delay is dependent on the motor speed, it is desirable to control it by automatic means which are dependent on this speed.

Following reconnection of the generator field winding in reverse sense, the field current tends to approach its steady-state value exponentially, due to the self-inductance of the winding, whereas a more rapid approach is essential to operating efficiency. It is desirable to provide means for accelerating the rise of current to its steady-state value, and to eliminate such means upon attainment of the steady-state value of the current.

In drives of the types discussed, the main driving motor and main generator may have their armatures permanently connected in a permanently closed loop. It is therefore necessary to provide demagnetizing means for the main generator, so that there is no tendency for residual magnetism in the generator field structure to induce a generator voltage which causes a flow of current of sufficient magnitude to rotate the driving motor armature at a creeping speed. In the present instance, the demagnetizing means comprises an auxiliary field winding, which upon stopping, is connected across the generator armature in such a manner, that it includes a field tending to automatically kill the residual generator magnetism.

Finally, it is desirable to so arrange the generator field discharge circuit so that upon stopping of the motor the generator field excitation is reduced at a rate which provides deceleration at a rapid rate which, however, is limited to afford satisfactory commutation of the armature currents.

An object of the present invention is to provide a system of the aforementioned type with means for reversing the generator field current, by first disconnecting the generator field winding from the source of supply and providing means which affords discharge of the generator field at a rate which is a function of the field current prior to the disconnection of the field circuit from the source of supply.

A further object is to provide a system which upon reversal of the generator field current impresses upon the field winding a voltage which causes the field strength to increase at the maximum rate permissible by the safe commutation of the generator and motor armature currents, and as a function of the ultimate steady current. After the field current has reached that value which corresponds to the desired maximum speed of the motor, a voltage is impressed on the generator field which affords the constant field current corresponding to the desired speed.

Another object is to provide a system wherein the reversal of the current in the generator field winding is subject to a delay which in turn is a function of the motor field excitation prior to initiation of said reversal.

In the drawings, Figure 1 is a diagram illustrative of an embodiment of the invention.

Fig. 2 is a simplified diagram of the circuits shown in Fig. 1, and

Figs. 3 and 4 are oscillograph records of the armature currents and the field currents of the generator and motor for different operating conditions.

The system shown in Fig. 1 (and in more simplified form in Fig. 2) comprises a contactor 1, which is energized for the forward or cutting movement of the planer, and a contactor 2, energized for the reverse or return movement. The contactor 1 has a closing coil $1^a$, and a lockout or restraining coil $1^b$, and normally open contacts $1^c$, $1^d$, $1^e$, $1^f$ and normally closed contacts $1^g$, $1^h$, $1^i$, $1^k$.

The reverse contactor 2 has a closing coil $2^a$ and a lockout or restraining coil $2^b$, normally open contacts $2^c$, $2^d$, $2^e$ and $2^f$, and normally closed contacts $2^g$, $2^h$, $2^i$ and $2^k$. The system also includes electromagnetic relays 3, 4 and 5. The relay 3 has a closing coil $3^a$, and normally open contacts $3^b$, $3^c$ and $3^d$, and normally closed contacts $3^e$, $3^f$ and $3^g$. The relay 4 has a shunt closing coil $4^a$ and a holding coil $4^b$, and is provided with normally open contacts $4^c$, $4^d$ and $4^e$, and normally closed contacts $4^f$. The relay 5 is provided with a closing magnet having an energizing coil $5^c$, a lockout or restraining magnet having differentially wound coils $5^a$ and $5^b$, a normally open contact $5^d$ and a normally closed contact $5^e$.

The power for operating the planer is supplied through a motor generator set which includes a motor 6. This motor may be of any type, and is shown in the present instance as being a polyphase induction motor, which runs continuously at a constant speed. Coupled to the induction motor is an exciter generator 7, having an armature $7^a$, and a shunt field winding $7^b$. The armature of the exciter supplies the direct current energy for the main field of a main generator 8 and a motor 10 of a Ward-Leonard system and the energy for the control circuits. Coupled to the motor 6 is the main generator 8 having an armature $8^a$, a main field winding $8^b$ and an auxiliary or demagnetizing field winding $8^c$. The main field winding is shunted by a discharge resistor 9, having a relatively high value of resistance. The generator armature 8 is connected in a closed loop with the armature $10^a$ of the reversible motor 10 which drives the planer. The motor 10 has an exciting winding $10^b$. The generator field winding $8^b$ is controlled in the cutting direction of the planer by an adjustable field rheostat 11, and another adjustable rheostat 12 provides for regulating the generator field winding $8^b$ for the return direction of the planer. An adjustable shunt field rheostat 13 is provided for controlling the motor field winding $10^b$ for the cutting direction of the planer, and an adjustable rheostat 14 provides for the control of the field winding $10^b$ for the return direction of the planer.

The operating shafts of the rheostats 13 and 11, and of the rheostats 14 and 12, respectively, are connected together so that the respective contact arms move in unison. If the contact arm of the rheostat 13 or 14 is at the extreme left, the resistance inserted in the circuit by said rheostat is a maximum while at the same time the resistance inserted into the circuit by the rheostat 11 or 12 is zero. Hence the generator field current is a maximum and the motor field current a minimum resulting in maximum motor speed. Moving the contact arm of the respective rheostat in a clockwise direction resistance is gradually cut out of the motor field circuit by the rheostat 13 or 14, while the resistance of the rheostat 11 or 12 remains zero. Further rotation of the rheostat arms in a clockwise direction maintains the resistance of the rheostat 13 or 14 at zero value, and gradually increases the resistance inserted by the rheostat 11 or 12, respectively, until in the extreme right hand position of the respective rheostats, the resistance inserted in the generator field circuit is a maximum and resistance inserted in the motor field circuit is zero, resulting in minimum motor speed.

The automatic operation of the planer may be controlled by two double-pole two-position snap limit switches 15 and 16, which are operated in the usual manner by abutments on the planer bed. The "cut" limit switch 15 has contacts $15^a$ and $15^b$, while the "return" limit switch 16 has contacts $16^a$ and $16^b$. The limit switches are normally in the positions shown in the diagram except at the end of the cutting and return strokes, when the respective switch is moved to the other extreme position until the planer has reversed its direction of travel and in returning again moves the particular switch to the extreme position thereof shown by one of the abutments on the planer bed.

There is also provided for manual control for starting of the equipment, a pair of manually operable pushbuttons 17 and 18, normally biased to the positions thereof shown in the drawings. The pushbutton 17 serves to start the equipment in the forward or cutting direction, and is equipped with normally open contacts $17^a$ and normally closed contacts $17^b$, while the pushbutton 18 is for starting the equipment in the return direction and is provided with normally closed contacts $18^a$, and normally open contacts $18^b$. The momentary depression of either one of the pushbuttons 17 or 18 will normally start the equipment in the respective direction, and the planer will continue to operate forth and back, until a stop pushbutton 19 with normally closed contacts is depressed.

For inching operations, that is for operating the planer in one direction or the other within its limits of travel, and only as long as they are depressed, the system includes two pushbuttons 20 and 21 for the cut and return directions, respectively. Said pushbuttons are normally biased to the positions thereof shown in Fig. 1. The pushbutton 20 has normally open contacts $20^a$, and normally closed contacts $20^b$, while the pushbutton 21 has normally open contacts $21^a$ and normally closed contacts $21^b$. For the rapid discharge of the field winding $8^b$, upon each reversal of operation, there are provided two field discharge resistors 22 and 23. These discharge resistors have a much lower resistance than the resistor 9. Each is connected in series with one of the rectifiers 24 and 25, respectively, so that current can flow through them only in one direction, and thus the rectifiers provide for selective discharge through one or the other of the discharge resistors. Connected in series with the motor field 10$^b$ is a field resistor 26, which is normally short circuited by the contact 4$^e$ during operation of the system. The exciter generator 7 supplies the lines L$^1$ and L$^2$ with power. One terminal of a resistor 28 is connected to the positive line L$^1$, while the other end of said resistor is connectable through the normally open contacts 5$^d$ and a resistor 29 to the negative line L$^2$. The auxiliary generator field winding 8$^c$ is connected across the armature 8$^a$ in a circuit including the normally closed contacts 1$^h$, 2$^h$ and 4$^f$. It is connected to generate a magnetic field in opposition to the main magnetic field. The holding coil 4$^b$ is connected in parallel with the armature 10$^a$.

The resistor 28 may be short circuited by a circuit extending from line L$^1$ through the normally closed contact 5$^e$, back through the resistor 28, to the line L$^1$. The winding 5$^b$ may be energized through a circuit extending from line L$^1$ through the resistor 28, normally closed contacts 3$^g$, an adjustable inching rheostat 30, the coil 5$^b$ to line L$^2$. A further circuit extends from line L$^1$ through a resistor 32, normally open contact 3$^d$, normally closed stop button 19, through the coil 3$^a$ to line L$^2$, while the coil 4$^a$ is connected in parallel with the coil 3$^a$. The connections of the various elements is clearly shown in the diagram Fig. 1 and will be described hereinafter in connection with the description of operation of the system.

If, with the parts of the equipment in the respective positions shown in the diagram, Fig. 1, it is desired to operate the planer for inching from the pushbuttons 20 and 21, it is first necessary to start the motor 6 and bring the motor 6, the exciter 7 and the generator 8 to full speed. The exciter 7 then supplies a constant exciter voltage and, as aforementioned, also supplies operating current to the lines L$^1$, L$^2$ for the control circuits.

To operate the planer in the cutting direction the pushbutton 20 is depressed. This establishes a circuit from L$^1$, contacts 3$^e$, 20$^a$, 21$^b$ of pushbutton 21, through coil 1$^a$ to line L$^2$. The current flowing in the circuit causes the forward switch 1 to be energized, to close its normally open contacts and open its normally closed contacts.

As the relay 3 is not energized, the contacts 3$^f$ are closed and therefore the rheostats 13 and 14, as well as the coils 1$^b$ and 2$^b$ are short circuited so that the motor field is energized by a current limited by the resistance 26. The coil 4$^b$ which is connected across the terminals of the motor armature does not have sufficient power to close the relay 4, but such closure is effected only by energization of coil 4$^a$ which remains deenergized during inching operation.

As indicated, the motor field rheostats 13 and 14 are short circuited but the motor operates on a partially weakened field due to the insertion of the resistor 26. The closure of the contact 1$^f$ also completes a circuit from line L$^1$ through contacts 3$^e$, 20$^a$, 21$^b$, 1$^f$, coil 5$^c$ to the line L$^2$. This energizes the relay 5, but the relay does not close immediately due to the action of the lockout coils 5$^b$ and 5$^a$. The two coils 5$^a$ and 5$^b$ are wound differentially and the coil 5$^a$ has a lesser number of turns than the coil 5$^b$. Their combined effect is such that the resultant lockout pull on the relay 5 becomes zero when the ampere turns in the two coils are approximately equal. With the relay 5 in the down position a circuit is closed from line L$^1$ over contacts 5$^e$, contacts 3$^g$, resistor 30, contacts 1$^d$, field 8$^b$, contact 1$^c$, coil 5$^a$ to line L$^2$. A circuit is also established in parallel with the field winding 8$^b$ from resistor 30, through coil 5$^b$, to the line L$^2$. The generator main field winding 8$^b$ is therefore connected to the lines L$^1$ and L$^2$ in series with inching rheostat 30, but exclusive of the resistor 28. Thus a voltage is temporarily impressed upon the generator field winding 8$^b$, which is in excess of the voltage required for the desired steady generator excitation. This accelerates the rise of the exciting current to its steady value. When the generator field current has reached its full value for any particular setting of the inching rheostat 30, the ampere turns in the coil 5$^a$ are equal to those in the coil 5$^b$, thus permitting the switch 5 to respond to the energization of coil 5$^c$ and to open its normally closed contacts and close its normally open contacts. A circuit is thereupon established from the line L$^1$ through rheostat 28, contacts 5$^d$, rheostat 29 to line L$^2$, while the current for the generator main field winding 8$^b$ now flows from line L$^1$, through rheostat 28, contacts 3$^g$, resistor 30, contacts 1$^d$, field winding 8$^b$, contacts 1$^c$, coil 5$^a$, to line L$^2$. If the pushbutton 20 is released switch 1 and relay 5 drop out and the generator main field 8$^b$ discharges through the resistor 9. At the same time the auxiliary field circuit is closed by closure of contacts 1$^h$ and the field 8$^c$ kills the residual magnetism of the generator in a known manner.

The operation of the reverse or return inching button 21 energizes the relay 2 by a circuit from line L$^1$ through contact 3$^e$, contacts 20$^b$, 21$^a$, contacts 1$^l$, coil 2$^a$ to line L$^2$. Closure of contacts 2$^d$ also completes a circuit from line L$^1$ through contacts 5$^e$, 3$^g$, rheostat 30, contacts 2$^d$, field winding 8$^b$ in a direction reverse to that aforediscussed, contacts 2, coil 5$^a$ to line L$^2$ and another circuit is established from rheostat 30, through coil 5$^b$ to line L$^2$. The generator main field winding 8$^b$ is now energized in the reverse direction and the motor 10 will therefore operate in the return direction until the pushbutton 21 is released.

If completely automatic operation in a forward or cutting direction is desired, the pushbutton 17 is depressed, closing its contacts 17$^a$ and opening its contacts 17$^b$. This completes a circuit from line L$^1$ over contacts 15$^a$, 18$^a$, 17$^a$, stop pushbutton 19, coil 4$^a$ to line L$^2$. A further circuit is established from contacts 19, through coil 3$^a$ to line L$^2$. Thus the closing coils of relays 3 and 4 are energized. A further circuit is established from contacts 18$^a$, through contacts 3$^b$, 2$^1$, through coil 1$^a$ of contactor 1, to line L$^2$ and the contactor 1 is energized. A further circuit extends from stop pushbutton 19 through coil 4$^a$ to line L$^2$, energizing the closing coil of relay 4. The response of the contactor 1 establishes a circuit from line L$^1$, through contacts 5$^e$, 1$^e$, rheostat 11, contacts 4$^c$, field 8$^b$, contacts 1$^c$, coil 5$^a$ to line L$^2$. The field winding 8$^b$ is thus energized in series with the rheostat 11 by the full exciter voltage. The coil 5$^b$ is connected in parallel with the field winding 8$^b$, through a circuit extending from contacts 4$^c$, through the contacts 1$^d$, coil 5$^b$, to line L$^2$, and the coil 5$^a$ is connected, as aforestated, in series with the field winding 8$^b$ through contact 1$^c$. After the generator main field current has attained a desired value the currents in the coils 5ª and 5ᵇ neutralize each other and the relay 5 is permitted to close by the action of coil 5ᶜ. This connects the field winding 8ᵇ in series with the resistor 28 and rheostat 11 and in parallel with resistor 29, as has been aforedescribed.

It will also be obvious that upon its response the relay 3 establishes a maintaining circuit for its closing coil 3ª from the line L¹ through resistor 32, contacts 3ᵈ, stop pushbutton 19, and through the coil 3ª to the line L².

The relay 3 also opens contacts 3ᶠ thereby opening the short circuit around the contacts 1ᵏ and 2ᵏ and permitting insertion of the motor field rheostat 13 or 14 into the circuit of field winding 10ᵇ of the motor upon response of the contactor 1 or 2, respectively. Insertion of one or the other of these rheostats effects further increase of the motor speed in accordance with the adjustment of the resistance of the respective rheostat.

At the end of the cutting stroke the limit switch 15 opens contacts 15ª and closes contacts 15ᵇ. Opening of contacts 15ª deenergizes coil 1ª and closure of contacts 15ᵇ establishes a circuit from line L¹ through contacts 16ª, 17ᵇ, 3ᶜ, 15ᵇ, coil 2ª, to line L² and the contactor 2 responds and opens the contacts 2¹ thereby preventing energization of contactor coil 1ª. The deenergization of contactor 1 opens the circuit of the field winding 8ᵇ, and the field is permitted to discharge through a circuit from the field 8ᵇ, through contacts 4ᶜ, rheostat 11, rectifier 25, rheostat 23, contacts 2ᵍ, contact 4ᵈ back to the field. It will be noted that the resistance of the discharge circuit is controlled by the adjustment of rheostat 11 in series with the field prior to the discharge. Hence the higher the excitation of the field before its disconnection from the line, the higher is the discharge current. Thus the discharge current and the rate of discharge vary with the field excitation.

When the contactor 2 responds the field discharge circuit is opened at 2ᵍ. The opening of the contacts 1ᶠ also deenergizes the coil 5ᶜ so that the relay 5 drops, the coil 5ᶜ being subsequently reenergized upon the closure of the contacts 2ᶠ of contactor 2. In the meantime, however, the coils 5ª and 5ᵇ are energized by the energization of the field winding 8ᵇ. This prevents the relay 5 from responding immediately but delays such response until the field current in the field winding 8ᵇ has again attained a desired value. The winding 8ᵇ is now energized in the reverse direction from line L¹ through contacts 5ᵉ and 2ᵉ, rheostat 12, contacts 4ᵈ, winding 8ᵇ, contacts 2ᶜ, coil 5ª to line L².

It will be noted that during the cutting stroke the coil 2ᵇ was connected in parallel with the rheostat 13. This energized the coil in accordance with the voltage drop in the rheostat and therefore in accordance with the forward motor speed. Upon return of contactor 1 to normal position the closure of its contact 1ᵏ short circuits the rheostat 13 and coil 2ᵇ, but the latter requires some time to discharge the energy of its magnetic field to a value which permits the contactor 2 to respond to energization of its winding 2ª. This time delay is sufficient to insure that the motor field strength has risen to substantially its maximum value at the moment when the generator field current starts to flow in reverse direction. Such time delay also permits the controlled decay of the generator field during this interval through the discharge resistor 22 or 23.

The retardation time varies with the voltage drop of the respective field rheostat and hence with the speed of the motor prior to initiation of reversal.

The planer now operates in the reverse or return direction and when the field current has attained a certain value the relay 5 responds, thereby reinserting the resistor 28 into the field circuit as aforedescribed. At the end of the reverse or return stroke the limit switch 16 opens the normally closed contacts 16ª and closes the normally open contacts 16ᵇ. The opening of contacts 16ª opens the energizing circuits of the coils 2ª and 5ᶜ.

The contactor 2 and relay 5 are thereby deenergized while the relay 1 is again energized as aforedescribed to start a cutting stroke. Prior to the response of the contactor 1 a discharge circuit is established from the winding 8ᵇ through the contacts 4ᶜ, the rectifier 24, resistor 22, contacts 1ᵍ, rheostat 12, contacts 4ᵈ, back to the field winding 8ᵇ. The generator field winding 8ᵇ therefore discharges at a rate depending upon the adjustment of the rheostat 12, which adjustment determined the field current on the previous return stroke.

As during automatic operation the relay 3 is always energized the cutting and return rheostat 13 or 14, respectively, in the motor field circuit may become effective. During the cutting stroke the return rheostat 14 is short circuited by normally closed contacts 2ᵏ on the contactor 2, while during the return stroke the cutting rheostat 13 is short circuited by normally closed contacts 1ᵏ of the contactor 1. As the lockout coils 1ᵇ and 2ᵇ are connected in parallel with the return rheostat 14 and the cutting rheostat 13, respectively, they are energized by a voltage equal to the voltage drop in the respective rheostat. Thus energization of the lockout coils 1ᵇ or 2ᵇ, respectively, effects a delay in the response of the corresponding contactor 1 or 2 as aforedescribed.

From the foregoing it will be obvious that when the equipment is at standstill and it is desired to start the automatic operation in the reverse or return direction the pushbutton 18 is depressed thereby energizing the contactor coil 2ª whereupon the equipment is energized for the reverse or return operation and the pushbutton switch 18 may be released and the equipment will continue to operate cyclically in the manner aforedescribed.

If during automatic operation it is desired to stop the equipment the pushbutton 19 is depressed. This opens the maintaining circuit for the coils 3ª and 4ª whereupon both of these coils are deenergized and the respective switches return to their normal positions. The deenergization of relay 3 opens the energizing circuits of the coils 1ª, 4ª and 5ᶜ. Deenergization of contactor 1 weakens the generator field current, which causes the motor to act as a generator and thus slows down the planer. The opening response of the relay 4 is delayed by the coil 4ᵇ which is connected across the motor terminals to maintain the voltage induced in the motor armature by maintaining the motor field excitation at a high value until the motor speed has slowed down sufficiently so that the motor field may be weakened by the insertion of the resistor 26 without unduly prolonging its deceleration period. Delay in opening response of relay 4 also insures the temporary maintenance of closure of the contacts 4ᶜ and 4ᵈ thereby insuring a discharge of the main generator field as aforedescribed through the rectifier 24 or 25 and corresponding resistor 22 or 23, respectively. Such delay in the opening response of relay 4 also acts to delay closure of contacts 4f, thereby preventing application of the demagnetizing effect of the auxiliary field winding 8c.

The discharge resistors 22 and 23 are preferably so adjusted that the discharge current of the field winding 8b through these discharge resistors does not exceed a desirable maximum when the resistance of the respective field rheostat 11 or 12 is adjusted to a low or zero value. The rectifiers 24 and 25 are so connected that they provide different discharge paths for the field winding 8b for reversal from the cutting movement to the return movement and for reversal from return movement to cutting movement, respectively. The corresponding discharge path includes in each case that field rheostat which was in series with the field winding prior to the initiation of reversal.

When the planer operates in the forward or cutting direction, the generator field current passes from the line L¹ through the rheostat 11 and thence over contacts 4c through the field winding 8b in the direction of the arrow. Upon disconnection of the field winding circuit from the line the discharge current from the field winding 8b flows in the direction of the arrow, that is, from the field winding through contacts 4d and 2g, resistor 23, rectifier 25, rheostat 11, over contacts 4c, back to the field winding 8b. No current can flow through rectifier 24, resistor 22, and the rheostat 12, as the rectifier permits flow of current in only one direction, and therefore the rheostat 12 and its associated circuit do not affect the discharge current of the field winding 8b, when the controller is actuated to reverse the equipment from the forward or cutting to the return operation.

On the other hand, if the generator field current flows in the field winding 8b in the direction opposite to that indicated by the arrow in Fig. 1; that is, if the equipment operated on the reverse or return stroke and is commutated for reversal to the forward or cutting stroke the discharge current of the winding 8b is in the direction opposite to the arrow, so that it now passes from the field winding through contacts 4c, rectifier 24, resistor 22, contacts 1g, rheostat 12, contacts 4d, back to the field winding 8b. No current can pass through the contacts 2g, resistor 23, or rheostat 11, as such path is blocked by the unidirectional conduction of the rectifier 25. This arrangement insures that with the system set for full automatic operation, the amplitude of the discharge current of the field winding 8b upon stoppage or reversal is always a function of the energization of said field winding prior to initiation of stoppage or reverse operation of the equipment.

The auxiliary or demagnetizing generator field winding 8c is connected across the generator terminals in a circuit including the normally closed contacts 1h, 2h and 4f. The function of this auxiliary field winding 8c is to demagnetize the generator field by a counter magnetomotive force, which overcomes the residual magnetism of the field magnetic circuit. During inching operations the relay 4 is not energized and therefore the contacts 4f are always closed. Hence upon deenergization of the switches 1 or 2 the auxiliary field winding 8c is connected across the generator armature to demagnetize the generator field. If during automatic operation the stop button 19 is depressed, the energizing coil 4a is deenergized but the relay 4 does not drop until the generator voltage has dropped to weaken the current in the winding 4b sufficiently to release the relay 4 and permit it to return to the off position. During this interval the field winding 8b has been discharged through the resistors 11 and 23, or 22 and 12, respectively, as aforediscussed, and the current in the motor generator loop has dropped to a sufficiently low value so that the reversal of the generator field excitation by the auxiliary field 8c will not seriously affect the commutation of either the generator or the motor.

Referring now to Figs. 3 and 4, the same show the generator field current and the current in the motor-generator armature loop. Fig. 3 refers to the commutation from a forward or cutting speed of the planer motor of 100 revolutions per minute, to a reverse or return speed of 600 revolutions per minute, while Fig. 4 illustrates the conditions in reversing from a forward or cutting speed of 1200 revolutions per minute, to a reverse or return speed of 600 revolutions per minute. The solid curves 51 and 53 of Fig. 3 and 55 and 57 of Fig. 4 show the conditions in the respective cases with the contact 5e of the relay 5 permanently open, and the contact 5d permanently closed, so that the voltage impressed on the generator field winding 8b is always equal to the steady voltage required to be impressed upon the generator field winding 8b to obtain the desired speed of the motor after commutation and reversal has taken place and the motor operates in the reverse or return direction at a constant speed. The dotted curves 50 and 52 of Fig. 3 and 54 and 56 of Fig. 4 show the conditions with a controller of the type illustrated in Figs. 1 and 2 of the drawings and operating as described; that is, so that during the reversal period a higher than normal voltage is temporarily impressed upon the main generator field winding 8b. The curves 50 and 51 of Fig. 3 and 54 and 55 of Fig. 4 refer specifically to the current of the generator field winding 8b with and without temporary increased field circuit voltage, respectively; while the curves 52 and 53 of Fig. 3 and 56 and 57 of Fig. 4 are the corresponding curves for the generator-motor armature current. At the point A in Fig. 3 the cutting contactor 1 opens, and the generator field is discharged in the manner aforedescribed. At the point B, shortly before the generator field current has dropped to zero, the return contactor 2 closes the field circuit, and full exciter voltage is impressed on the field winding 8b of the generator. The field current then reverses and increases at a rapid rate to the point C, at which point the current is slightly above the desired generator field current for the reverse or return speed. At this moment the relay 5 responds, thereby reducing the voltage impressed on the generator field, and the field current again drops to the constant value corresponding to the desired normal field current. When the normal steady current is impressed upon the generator field as shown by curve 51 the field current varies approximately the same as in the former case up to the point B, but from there on due to the lower electromotive forces impressed upon the field circuit, the field current rises very slowly to the ultimate steady value, and does not reach this steady value until the point D is reached. It will be seen that in this case the time required for the full field current to attain its desired value in the reverse direction is several times the time required under the conditions shown by curve 50.

Referring now to the current in the loop, Fig. 3, it will be seen that in both cases the current increases from a low steady value to the point B in approximately the same manner for both methods of control. However, by forcing the field, the accelerating current of the motor in the opposite direction attains a higher value, which higher value persists for some time after the moment C, whereupon the armature current drops to the steady running value. In the case of the constant applied lower field voltage the current varies in accordance with the curve 53, and does not reach its final value until the moment D, as is to be expected. In other words, the motor requires a much longer time to attain its steady speed than in the former case.

The condition is similar where the motor speed is varied from a very high cutting speed to a return speed the same as that of Fig. 3, as illustrated in Fig. 4. The curves 54 to 57, inclusive, of Fig. 4 illustrate the current conditions in the same circuits as covered by curves 50 to 53, inclusive, of Fig. 3. As is to be expected the time required to reach the moment C at which the voltage impressed on the generator field winding 9b after reversal is reduced from a higher to the normal value by actuation of the relay 5, requires a slightly longer time, as indicated by curve 54, because the generator field prior to the moment A had a higher value due to the higher forward or cutting speed, and the corresponding higher generator voltage required. It will also be noted that the discharge time between the moment A and the moment B; that is, between the moment when the contactor 1 opens and the contactor 2 closes is also increased. This is due to the fact that the delaying effect of the coil 2b on the closure of the contactor 2 is greater in the case of Fig. 4, because the motor field in the cutting direction was weakened by a higher value of the cutting resistor 13 than it was in the first case, with the result that the energization of the coil 2b was higher and the resistance of the discharge circuit was higher, so that the remaining effect of the coil 2b was higher and persisted for a longer time in accordance with the higher speed of the motor in the cutting direction, as shown by curve 54.

It will thus be apparent, that the time of reversal of the generator field varies in accordance with the degree of energization of the generator as well as that of the motor prior to such reversal. Furthermore, due to the temporary excess energization of the generator field winding 9b, the reversal is accomplished in the shortest time permissible by the commutation characteristics of the motor and generator.

The method described herein of temporarily increasing the voltage impressed upon the field winding of the generator so as to speed up the attainment of full field current upon acceleration of the motor associated with the generator may also be employed for starting a non-reversing motor from rest by a variable voltage generator of the type described herein.

The delayed reversal of the generator field current for a period which is a function of the motor speed prior to such reversal, as has been described before, may be employed without temporarily impressing an excess voltage on the generator field winding upon reversal.

Other obvious modifications of the system coming within the scope of the foregoing disclosure and the appended claims will be apparent.

What we claim as new and desire to secure by Letters Patent is:

1. An electric reciprocating drive, comprising, in combination, a variable voltage generator having an exciting winding, a reversible motor supplied with energy by said generator and having a field winding, means to alternatively supply current to said generator exciting winding in opposite directions, an individual field regulator for regulating the strength of said exciting current in each direction independent of said strength in the other direction, separate means associated with each field regulator and arranged to provide upon termination of current supply through the latter for discharge of said generator exciting winding through a circuit including the respective field regulator, means for supplying a variable current to said motor field winding for opposite directions of rotation of said motor, means responsive to the field current of said motor prior to the reversal of said generator exciting current to delay said reversal, and means effective upon such reversal to temporarily impress an excess voltage on said generator exciting winding and to reduce said impressed voltage upon attainment of the desired value by said exciting current.

2. An electric reciprocating drive, comprising, in combination, a variable voltage generator having an exciting winding, a reversible motor supplied with energy by said generator and having a field winding, a pair of electomagnetic reversing switches arranged to alternatively connect said generator exciting winding to a source of current in opposite directions, a variable field rheostat for each direction connectable to said exciting winding by the respective electromagnetic switch, separate means associated with each field rheostat and arranged to provide upon termination of current supply through the latter for discharge of said exciting winding through a circuit including the respective field rheostat, separate means for each direction of rotation of said motor and cooperating with said reversing switches for supplying a variable current to the motor field winding, means responsive to the field current of said motor prior to the reversal of the generator exciting current to delay said reversal to delay the response of the respective reversing switch, means effective upon such reversal to temporarily impress an excess voltage on the exciting circuit of said generator, and an electromagnetic switch responding to the generator exciting current to reduce said impressed voltage when the exciting current has attained a desired strength.

3. An electric reciprocating drive, comprising, in combination, a variable voltage generator having an exciting winding, a reversible motor supplied with energy by said generator and having a field winding, means to alternatively supply current to said generator exciting winding in opposite directions, an individual field regulator for regulating the strength of said exciting current in each direction independent of the strength in the other direction, an unidirectional conduction device associated with each field regulator and arranged to provide upon termination of current supply through the latter for discharge of said generator exciting winding through a circuit including the respective field regulator, means for supplying a variable current to said motor field winding for opposite directions of rotation of said motor, means responsive to the field current of said motor prior to the reversal of said generator exciting current to delay its reversal, and means effective upon each reversal to temporarily impress an excess voltage on said generator exciting winding and to reduce said impressed voltage upon attainment of the desired value by said exciting current.

4. An electric reciprocating drive, comprising, in combination, a variable voltage generator having an exciting winding, a reversible motor supplied with energy by said generator, means to alternatively supply current to said generator exciting winding in opposite directions, and means effective upon reversal of said exciting current and directly responsive thereto to temporarily impress an excess voltage on said exciting winding and to reduce said voltage to the value corresponding to a desired exciting current strength upon attainment of said strength.

5. An electric drive, comprising, in combination, a variable voltage generator having an exciting winding, a driving motor supplied with energy by said generator, and means to supply current to said generator exciting winding, including means effective upon initiation of supply of said current and directly responsive to the latter to temporarily impress an excess voltage on said exciting winding and to reduce said impressed voltage to the value corresponding to a desired exciting current strength upon attainment of said strength.

6. An electric reciprocating drive, comprising, in combination, a variable voltage generator having an exciting winding, a reversible motor supplied with energy by said generator, means to alternatively supply current to said exciting winding in opposite directions, means to short circuit said generator exciting winding for discharging the energy stored therein after termination of current supply thereto in one direction and prior to current supply thereto in another direction, and means directly responsive to the current in said exciting winding to thereupon impress an excess voltage on said exciting winding tending to force an excess reverse current therethrough and thereafter to reduce said voltage to the value corresponding to a desired exciting current strength upon attainment of said strength.

7. An electric drive, comprising, a generator having an armature and a reversible exciting winding, a driving motor having an armature connected in a closed loop with said generator armature, a field winding for said motor, a pair of electromagnetic reversing switches arranged to alternatively connect said generator exciting winding to a source of current in opposite directions, a variable field rheostat in circuit with said exciting winding, means effective upon reversal of said generator exciting winding to temporarily impress an excess voltage thereon, and means directly responsive to the magnitude of the current in said exciting winding to reduce said impressed voltage when such current has attained a desired strength.

8. An electric drive, comprising, a generator having an armature and a reversible exciting winding, a driving motor having an armature connected in a closed loop with said generator armature, a field winding for said motor, a pair of electromagnetic reversing switches arranged to alternatively connect said generator exciting winding to a source of current in opposite directions, a variable field rheostat in circuit with said exciting winding, means to supply a variable field current to said motor, means responsive to the field current of said motor to delay response of said electromagnetic reversing switch to reverse said generator exciting winding, means effective upon reversal of said generator exciting winding to temporarily impress an excess voltage thereon, and means responsive to said exciting current to reduce said impressed voltage when such current has attained a desired strength.

9. An electric drive, comprising, in combination, a generator having an armature and an exciting winding, a driving motor having an armature connected in a closed loop with said generator armature, a field winding for said motor, electromagnetic means to supply current to said generator exciting winding, said means including a restraining winding responsive to the field current of said motor and effective upon initiation of supply of current to said exciting winding to delay response of said electromagnetic means to connect said generator exciting winding to said source of current.

10. An electric reciprocating drive, comprising, in combination, a variable voltage generator including an exciting winding, a driving motor having an armature connected to the armature of said generator, means to alternatively supply exciting current to said generator exciting winding in opposite directions, and means responsive to the inrush value of said exciting current to temporarily impress an excess voltage on said exciting winding and means to reduce said voltage to the value corresponding to a constant desired exciting current strength upon attainment of said strength.

11. An electric reciprocating drive, comprising, in combination, a variable voltage generator including an exciting winding, a reversible motor supplied with energy by said generator and having a field winding, a pair of electromagnetic reversing switches each having an "off" position and an "on" position and arranged to alternatively connect said generator exciting winding in their "on" position to a source of current in opposite directions, a variable field rheostat for each direction connectable to said exciting winding by the respective electromagnetic switch, means effective prior to reversal of said exciting current by said reversing switches to short circuit said exciting winding through a circuit including the respective field rheostat, separate means for each direction of rotation of said motor for supplying field current to said motor field winding, each including a field rheostat and each controlled by the respective electromagnetic switch, a restraining winding on each electromagnetic switch and connected in parallel with the motor field rheostat controlled by the other switch and arranged to delay the response of said one switch in accordance with the magnitude of the respective field current, means effective upon reversal of the generator exciting current to temporarily impress an excess voltage on the exciting circuit of said generator, and an electromagnetic switch responding to the generator exciting current to reduce said impressed voltage when the exciting current has attained the desired value.

12. An electric drive, comprising, in combination, a variable voltage generator having a field magnet frame and an exciting winding cooperating therewith, a driving motor supplied with energy by said generator, means to supply current to said generator exciting winding including means effective upon initiation of supply of said current and directly responsive to the latter to temporarily impress an excess voltage on said exciting winding and to reduce said impressed voltage to the value corresponding to a desired exciting current strength upon attainment of said strength, and means responsive to the generator voltage and effective after termination of supply of exciting current to said exciting winding to eliminate the residual magnetism in the magnet frame of said generator.

13. An electric drive, comprising, in combination, a variable voltage generator having a field magnet frame, an exciting winding and a demagnetizing winding on said frame, a driving motor supplied with energy by said generator, means to supply current to said exciting winding including means effective upon initiation of supply of said current and directly responsive to the latter to temporarily impress an excess voltage on said exciting winding and to reduce said impressed voltage to the value corresponding to a desired exciting current strength upon attainment of said strength, and means responsive to the generator voltage and to the operation of said first mentioned means to impress said generator voltage upon said demagnetizing winding.

14. An electric drive, comprising, in combination, a variable voltage generator having a magnetic frame provided with an exciting winding and a demagnetizing winding, a driving motor supplied with energy by said generator, means to supply current to said exciting winding including means effective upon initiation of supply of said current and directly responsive to the latter to temporarily impress an excess voltage on said exciting winding, and to reduce said impressed voltage to the value corresponding to a desired exciting current strength upon attainment of said strength, and an electromagnetic switch responsive to the operation of said exciting current supply means and to the terminal voltage of said generator to connect said demagnetizing winding to the latter.

15. An electric reciprocating drive, comprising, in combination, a variable voltage generator including an exciting winding and a demagnetizing winding, a reversible motor supplied with energy by said generator and having a field winding, a pair of alternatively operable electromagnetic reversing switches each having an "off" position and an "on" position and arranged in the "on" positions thereof to connect said generator exciting winding to a source of current in opposite directions, respectively, a variable field rheostat for each direction connectable to said exciting winding by the respective electromagnetic switch, means effective prior to reversal of said exciting current by said reversing switches to short circuit said exciting winding through a circuit including the field rheostat in circuit with said exciting winding prior to the termination of said supply of exciting current, separate means for each direction of rotation of said motor each including a field rheostat and controlled by the respective electromagnetic switch for supplying a variable current to the motor field winding, a restraining winding on each electromagnetic switch and connected in parallel with the motor field rheostat controlled by the other of said switches, and arranged to delay the response of said one switch, means effective upon reversal of the generator exciting current to temporarily impress an excess voltage on the exciting circuit of said generator, an electromagnetic switch responding to the generator exciting current to reduce said impressed voltage when the exciting current has attained the desired value, manual means to temporarily energize said electromagnetic reversing switches selectively, other manual means, one for each of said reversing switches for alternative initiation in either direction of cyclic operation of said reversing switches, by alternate energization of said switches, means to alternate said reversing switches in response to the reciprocation of said driving means, means to terminate said cyclic operation of said reversing switches, and means energized by said other manual means and effective upon termination of the supply of exciting current to impress said generator voltage upon said demagnetizing winding.

16. An electric reciprocating drive, comprising, in combination, a variable voltage generator including an exciting winding and a demagnetizing winding, a reversible motor supplied with energy by said generator, a pair of alternatively operable electromagnetic reversing switches each having an "off" position and an "on" position and arranged in the respective "on" positions thereof to connect said generator exciting winding to a source of current in opposite directions, respectively, means effective prior to reversal of said exciting current by said reversing switches to short circuit said exciting winding through a circuit including the field rheostat in circuit with said exciting winding prior to the termination of said supply of exciting current, means effective upon reversal of the generator exciting current to temporarily impress an excess voltage on the exciting circuit of said generator, an electromagnetic switch responding to the generator exciting current to reduce said impressed voltage when the exciting current has attained the desired value, manual means to temporarily energize said electromagnetic reversing switches selectively, other manual means, one for each of said reversing switches for alternative initiation in either direction of cyclic operation of said reversing switches by alternate energization of said switches, means to alternate said reversing switches in response to the reciprocation of said driving means, means to terminate said cyclic operation of said reversing switches, and means energized by said other manual means and effective upon termination of supply of exciting current to impress said generator voltage upon said demagnetizing winding.

17. An electric drive, comprising, in combination, a variable voltage generator having a field magnet frame and an exciting winding cooperating therewith, a driving motor supplied with energy by said generator and provided with a field winding, means to supply current to said windings, including means effective upon initiation of supply of said current and directly responsive to the latter to temporarily impress an excess voltage on said exciting winding and to reduce said impressed voltage to the value corresponding to a desired exciting current strength upon attainment of said strength, and means responsive to the generator voltage and effective after termination of supply of exciting current to said exciting winding to eliminate the residual magnetism in the magnet frame of said generator and to simultaneously vary the current supplied to said motor field winding.

18. An electric drive, comprising, in combination, a variable voltage generator having a field magnet frame, an exciting winding and a demagnetizing winding on said frame, a driving motor supplied with energy by said generator and provided with a field winding, means to supply current to said generator exciting winding and said motor field winding and including means effective upon initiation of supply of said current and directly responsive to the latter to temporarily impress an excess voltage on said exciting winding and to reduce said impressed voltage to the value corresponding to a desired exciting current strength upon attainment of said strength, and means responsive to the generator voltage and to the operation of said first-mentioned means to impress said generator voltage upon said demagnetizing winding and to simultaneously vary the current supplied to said motor field winding.

19. An electric drive, comprising, in combination, a variable voltage generator having a magnet frame provided with an exciting winding and a demagnetizing winding, a driving motor supplied with energy by said generator and provided with a field winding, means to supply current to said exciting winding and said motor field winding and including means effective upon initiation of supply of said current and directly responsive to the latter to temporarily impress an excess voltage on said exciting winding and to reduce said impressed voltage to the value corresponding to a desired exciting current strength upon attainment of said strength, and an electromagnetic switch responsive to the operation of said exciting current supply means and to the terminal voltage of said generator to connect said demagnetizing winding to the latter and to simultaneously vary the current supplied to said motor field winding.

20. An electric drive, comprising, in combination, a variable voltage generator having an exciting winding, a driving motor supplied with energy by said generator, means to supply current to said generator exciting winding including means effective upon initiation of supply of said current and directly responsive to the latter to temporarily impress an excess voltage on said exciting current supply means, and means responsive to said exciting current and to the voltage of the generator exciting winding to reduce said impressed voltage when such current has attained a desired strength.

21. An electric drive, comprising, in combination, a variable voltage generator having an exciting winding, a driving motor supplied with energy by said generator, means to supply current to said generator exciting winding, an electromagnetic switch for commutating said current supply means and provided with a closing electromagnet and with a restraining electromagnet having two differentially wound energizing windings, one of said last-mentioned windings being connected in series with said exciting winding and the other being arranged to have impressed thereon a voltage which varies with the voltage of said exciting winding, said switch being effective upon initiation of supply of exciting current to provide for temporarily impressing an excess voltage on said current supply means and to reduce said impressed voltage to the value corresponding to a desired current strength, when the pull of said closing electromagnet exceeds the pull of said restraining electromagnet.

22. A dynamo-electric machine having an exciting winding, a source of variable voltage for supplying current to a circuit including said exciting winding, a two-position electromagnetic switch normally biased to one position and arranged to impress upon said exciting winding circuit a relatively high voltage when in said one position and a relatively low voltage when in said other position, said switch including a closing magnet tending when energized to move the latter to said other position, and a restraining magnet tending when energized to counteract the effect of said closing magnet and restraining said switch to said one position, said restraining magnet having an energizing coil connected in series and an opposing coil connected in parallel with said generator exciting winding.

23. A dynamo-electric machine having an exciting winding, a source of variable voltage for supplying current to a circuit including said exciting winding, a two-position electromagnetic switch normally biased to one position and arranged to impress upon said exciting winding circuit a relatively high voltage when in said one position and a relatively low voltage when in said other position, said switch including a closing magnet tending when energized to move the latter to said other position and a restraining magnet tending when energized to counteract the effect of said closing magnet and restraining said switch to said one position, said restraining magnet having an energizing coil responsive to the current in said generator exciting winding and an opposing winding responsive to a voltage which varies in accordance with the voltage obtaining across said exciting winding.

ROBERT O. PERRINE.
CARROLL STANSBURY.